Dec. 23, 1930.  W. E. HUGHES  1,786,114
COMPRESSOR SYSTEM
Filed Dec. 18, 1928  2 Sheets-Sheet 1
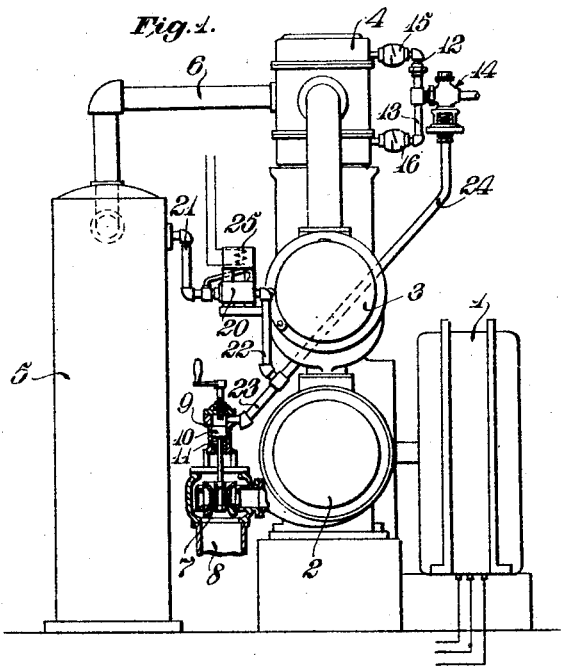
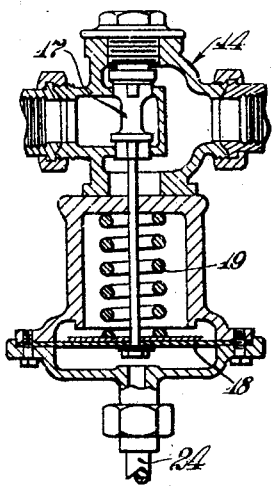
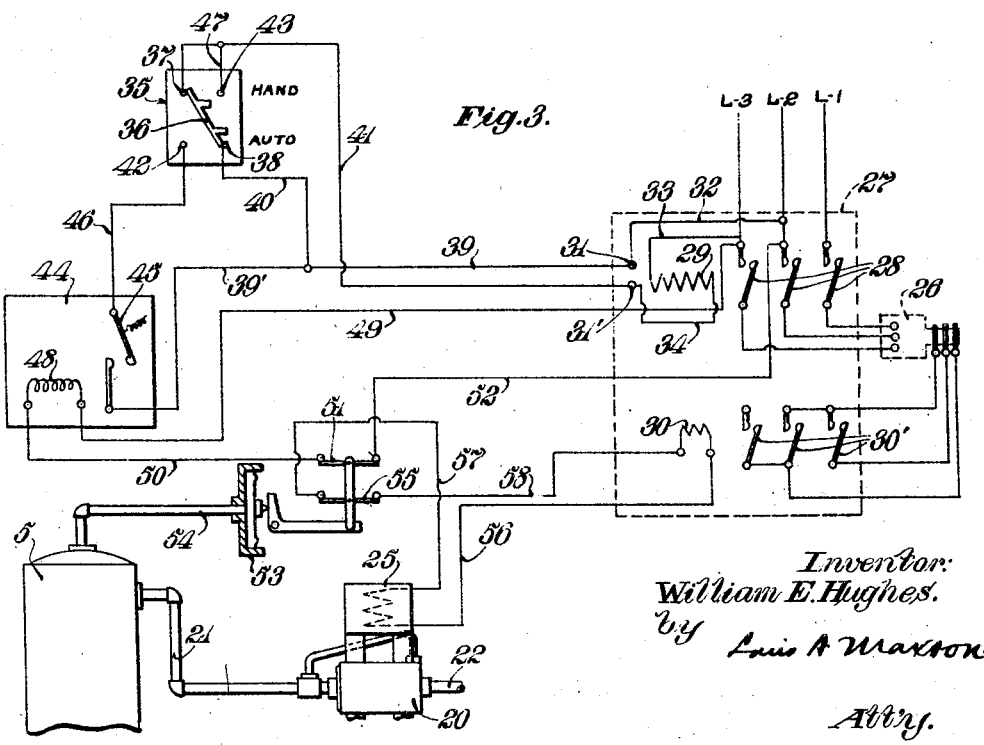
Inventor:
William E. Hughes.
by Louis A. Maxson
Atty.

Inventor:
William E. Hughes.
by Louis A. Maxam
Atty.

Patented Dec. 23, 1930

1,786,114

UNITED STATES PATENT OFFICE

WILLIAM E. HUGHES, OF CHICAGO, ILLINOIS, ASSIGNOR TO SULLIVAN MACHINERY COMPANY, A CORPORATION OF MASSACHUSETTS

COMPRESSOR SYSTEM

Application filed December 18, 1928. Serial No. 326,807.

My invention relates to automatic apparatus for controlling a fluid compressor and its driving motor.

An object of my invention is to devise an improved automatic start and stop compressor control system having improved means for unloading the compressor a predetermined time before stopping of the motor. With some known types of automatic start and stop control systems, some of which have means for holding the compressor unloaded until the motor has been started, the power is cut off from the motor when the receiver tank pressure reaches a predetermined maximum without unloading the compressor and this operation causes a very sudden stopping of the motor and compressor due to the fact that the compressor is under load. When the rotating parts of a machine are of heavy construction as found in large direct motor drives, the sudden stopping of the motor and compressor causes jars and sudden stresses to be imparted to all parts of the machine. Again with a belted motor drive the sudden stopping of the machine under load is very objectionable because the belt is liable to be thrown off or broken. It is therefore obviously desirable to unload the compressor before cutting off the power in these belted drive systems. A more specific object of my invention is to provide a combination of units of standard construction adapted for operation with ordinary motor starting equipment whereby the load may be removed from the compressor before the motor is stopped. A still further object of the invention is to provide pressure responsive means for unloading the compressor and for stopping the motor in conjunction with a time relay for cutting off the power supply to the motor a definite time after unloading of the compressor. In one embodiment of my invention there is employed a definite time relay having an energizing circuit controlled by the same pressure responsive device which controls loading and unloading of the compressor, and this time relay is of such construction that it will close a circuit immediately when energized and open the circuit after a definite time delay when de-energized. This time relay is made to control the starting circuit of the motor so that the motor is started immediately on energizing of the relay and stopped a definite time after the latter is de-energized. My improved controlling system is adaptable for use with any of the standard types of electric motors and I have disclosed in this application suitable connections for a synchronous motor, a slip ring induction motor, and a squirrel cage induction motor. Other objects and advantages of the invention will appear during the course of the following specification.

In the accompanying drawings I have shown for purposes of illustration three embodiments of my invention.

In these drawings,—

Fig. 1 is a diagrammatic view of an electric motor driving an angle compound compressor and the associated apparatus with which my invention may be employed.

Fig. 2 is a sectional view through the high pressure relief valve.

Fig. 3 is a schematic diagram of my invention as applied to a slip ring induction motor drive.

Figure 4:
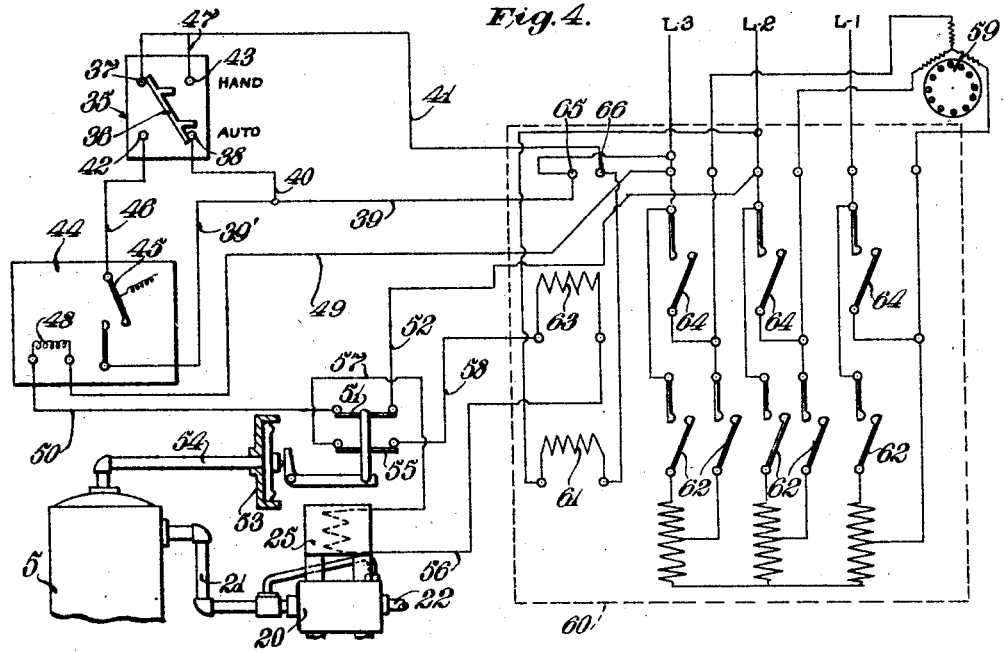
Fig. 4 is a similar view showing the wiring diagram as connected to the starting panel for a squirrel cage motor drive.

In Fig. 1 I have shown a diagrammatic view of a compressing system having an electric motor 1 direct connected to an angle compound compressor having a low pressure cylinder 2, an intercooler 3, and a high pressure cylinder 4 discharging to a receiver tank 5 by way of a discharge pipe 6. This is only one example of a compressor with which my invention may be employed, for obviously it will be useful with all types of multi-stage compressors, as well as single stage compressors. Suitable means are illustrated for unloading both cylinders of the angle compound compressor and these unloading devices are also only examples of many different systems of unloading with which my invention may be equally useful. The unloader for the low pressure cylinder is illustrated as being of the total closure intake type, employing a double seating valve 7 for controlling the intake of fluid through the intake 8 to the inlet valves at the opposite ends of the low pressure cylinder. This valve is controlled by a fluid pressure operated mechanism shown directly above the unloading valve which comprises a cylinder 9 in which operates a piston 10, which is forced downward when fluid pressure is admitted to the top of the cylinder to close the unloading valve and unload the compressor. When the cylinder is vented to atmosphere, the unloading valve will be actuated to open position by means of a spring 11.

The mechanism for effecting unloading of the high pressure cylinder simultaneously with unloading of the low pressure cylinder will now be briefly described. The opposite ends of the high pressure cylinder are connected by pipes 12 and 13 to a common relief valve generally designated 14, outwardly opening check valves 15 and 16 being interposed in the pipes 12 and 13 respectively. The relief valve mechanism may be of any suitable type and is herein shown as a simple diaphragm operated valve having a double seating valve element 17 actuated to open position by a diaphragm 18 and normally held in closed position when pressure is relieved from the diaphragm 18 by means of a spring 19.

The unloading devices for the high and low pressure cylinders are supplied with fluid pressure under the control of a pilot valve 20 connected to the receiver tank by pipe 21 and to the unloaders through pipe 22 which has branches 23 and 24 leading to the low and high pressure cylinders respectively. The pilot valve may be of any standard type and in fact for the purposes of my invention may be a simple three-way valve having connections leading to the receiver tank, to the unloaders, and to the atmosphere. The type of valve illustrated is commonly known as the Penn pilot valve. A suitable mechanism is provided for controlling the pilot valve 20 comprising an electromagnet 25 which may be connected to the Penn pilot valve as disclosed in a copending application of John W. Sanford, Serial No. 262,520, filed March 17, 1928. As shown in the said Sanford application, the pilot valve is held in position to supply pressure fluid to the unloaders when the solenoid 25 is de-energized and thus the compressor is unloaded independently of the precise receiver tank pressure provided there is enough pressure in the receiver to make unloaded starting important. When the solenoid 25 is energized, the compressor may be loaded and the loading and unloading operations controlled by the pilot valve 20.

Referring now to the wiring diagram of Fig. 3, at the right hand side of the figure is illustrated a slip ring induction motor 26 and an automatic starting panel 27. The equipment on this automatic starting panel will not be described in detail since it is a standard unit and does not need to be of any particular construction as regards its specific details. In operation, a set of primary contractors 28 are closed upon energization of the primary contactor coil 29 and, after the motor has started, the secondary contactor coil 30 is energized at the proper time and the secondary run contactors 30' are closed. Power is supplied to the motor through the starting panel from lines L1, L2, L3.

The means for controlling the circuit through the primary contactor coil for controlling stopping and starting of the motor will now be described. The starting panel includes connections from the power leads through the coil 29 to the contacts 31 and 31' on the starting panel which comprise a wire 32 leading from contact 31 to L2, wire 33 leading from L3 to one side of the contactor coil and wire 34 leading from the other side of the coil to contact 31' on the starting panel. A special switch generally designated 35 has two positions whereby the motor may be selectively controlled by hand or by an automatic apparatus to be later described. When the hand button is depressed, the switch element 36 will connect contacts 37 and 38 (in which position the switch is shown), and a circuit through the coil 29 will be closed through wire 39 leading from contact 31, wire 40, switch 36 and wire 41. The starting and stopping of the motor may thus be controlled by hand. In order to connect the automatic controlling apparatus to the starting contactor coil 29, the automatic button is depressed and the switch element 36 connects contacts 42 and 43. The circuit now leads from the contact 31 through wire 39, wire 39' to the definite time relay 44 which has a switch 45 one side of which is connected to 42 by a wire 46. Contact 43 on the hand control switch is connected to wire 41 by a wire 47. The circuit is now completed through contact 43 and wire 47 to wire 41 and the contact 31'. The mechanism of the definite time relay 44 has not been shown in detail since it may comprise simply a standard relay unit of the type which will close immediately when energized and open after a definite time delay when de-energized. The energizing coil of the relay is indicated at 48 and the means for energizing and de-energizing this coil is automatic. One side of this coil connects directly to the power line L3 by a wire 49 while the other side is connected to power line L2 by wire 50, switch 51 and wire 52. The switch element 51 is part of a double pressure switch indicated at 53 which is connected to the receiver tank by a pipe 54 and is adapted to open switch elements 51 and 55 upon a predetermined high pressure in the receiver tank and close said switches upon a predetermined low pressure in the receiver tank. Switch 55 controls the energizing circuit for the solenoid 25 which is connected across the secondary run contactor coil 30 on the starting panel by means of a wire 56 on one side, and on the other side by wire 57, switch 55, and wire 58. In view of this connection power for energizing the circuit through the solenoid coil 25 will not be available until the motor has started and the secondary run coil been energized. Then, while the motor is running, the energizing circuit for the solenoid coil is controlled by the pressure switch 53.

The operation of the wiring diagram of Fig. 3 should now be clear from the above description. When hand control for the motor is selected, the equipment on the automatic starting panel will function in the ordinary manner when the initial contactor coil 29 is energized by depressing the hand button on the switch 35. The compressor will be held unloaded until the motor has started due to the fact that the solenoid coil 25 cannot be energized until the secondary run contactor 30 is energized. The motor and compressor will now run continuously and loading and unloading of the compressor may be controlled by the element 55 of the pressure switch, which will energize the solenoid coil to effect loading of the compressor upon a predetermined low pressure in the receiver tank and de-energize said coil to effect unloading when a predetermined high pressure is reached. Now when automatic starting and stopping of the motor is desired, the automatic button on switch 55 will be depressed and the starting contactor coil 29 is now under the control of the time relay 44. If we assume that the pressure in the receiver tank is below the predetermined point at which switch 53 is set to close coil 48, the relay will be energized through wires 49, 50, switch 51 and wire 52. The switch 45 of the relay will then be closed and the contactor coil 29 energized. The motor will come up to speed and the system operates to load the compressor in a manner similar to the hand operation.

When the pressure in the receiver tank builds up to a predetermined maximum, the pressure switch 53 will open the switch element 55 causing de-energization of the solenoid coil 25 and the compressor is thus immediately unloaded through the action of pilot valve 20 which supplies pressure fluid to the unloaders through pipes 22, 23 and 24. Simultaneously element 51 of the pressure switch de-energizes coil 48 of the relay and the mechanism of the relay will be set into operation and after a time delay, switch 45 will open and break the circuit through the primary contactor coil. However, it will be noted that the motor continues running a definite time after opening of the pressure switch which will permit the compressor to be completely unloaded before power is cut off from the motor. The motor now comes to a gradual stop since it has no load except the friction of the compressor and its own bearings.

Figure 5:
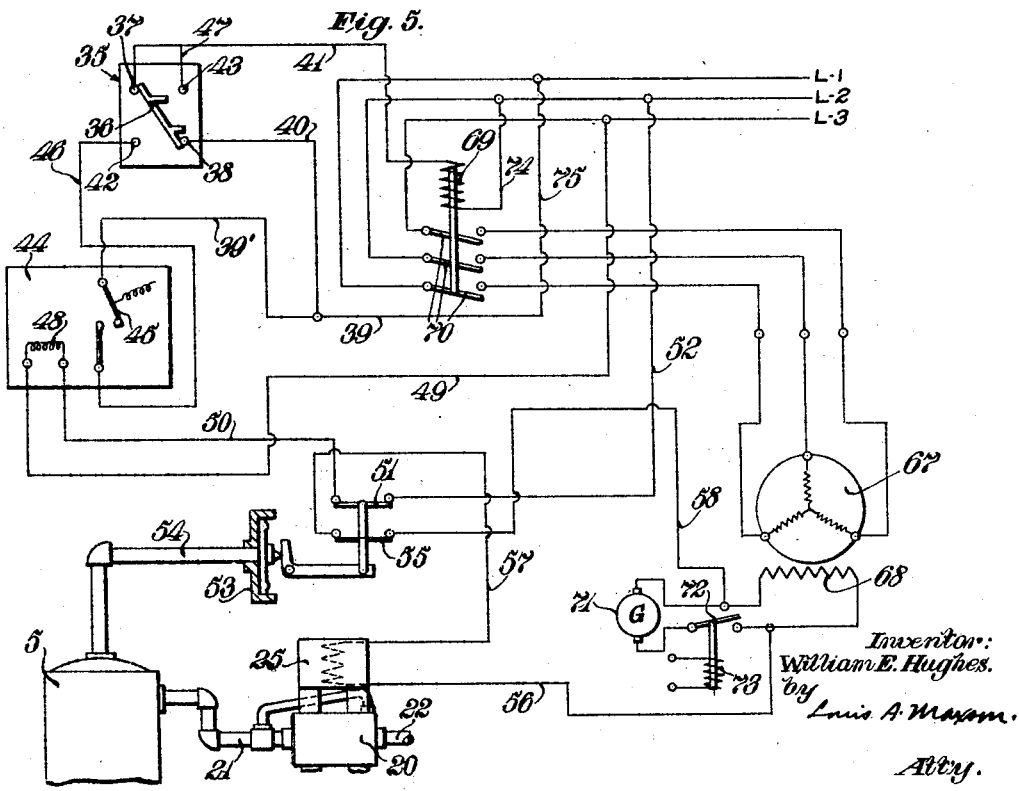
Fig. 5 is a similar view showing the wiring diagram as connected in a synchronous motor drive.

In Figs. 4 and 5 suitable connections for the same pieces of controlling equipment as described in connection with Fig. 3 are shown in conjunction with a squirrel cage induction motor drive and a synchronous motor drive respectively. The parts are given the same numbers as in Fig. 3 so for as they are similar to the parts shown in Fig. 3 and the operation in each case is substantially the same. In Fig. 4 a squirrel cage motor is indicated at 59 and an automatic starting panel therefor at 60. The equipment on this starting panel includes a starting contactor coil 61 for controlling the starting contactors 62 and a run contactor coil 63 for operating the run contactors 64. Power is supplied to the apparatus through lines L1, L2, L3 and the starting contactor coil is energized fom 12 through the hand or automatic apparatus and back to L3. Lines 39 and 41 of the controlling apparatus connect two contacts 65 and 66 which correspond to contacts 31 and 31' on the starting panel for the slip ring induction motor. The unloader solenoid coil 25 is connected across the run contactor coil 63 which corresponds to the run contactor coil 30 in Fig. 3. The operation of the parts is substantially the same as in the case of the slip ring induction motor of Fig. 3.

In Fig. 5 there is illustrated a diagram of a synchronous motor 67 having a field winding 68 and it will of course be understood that the combination of equipment comprising my invention may be connected into any of the well-known types of synchronous motor starting panels. As in the case of the other two motors, the complete equipment on this automatic starting panel has not been illustrated, but it is sufficient for the purposes of this invention to say merely that it includes a starting contactor coil 69 for operating the starting contactors 70 connecting the motor across lines L1, L2, L3. When the motor has reached synchronous speed, its field 68 will be energized from the generator 71 under the control of a suitable automatic field switch 72 which is operated by a coil indicated for convenience at 73. The connections for this coil and other means controlling the field switch are all found on any of the standard synchronous motor starting panels. The solenoid coil 25 controlling the unloaders is in this instance energized with direct current across the synchronous motor field leads so that the source of power for energizing the solenoid is not available until the motor has come up to speed and has been synchronized. The connections for the hand control switch 35 and time delay relay 44 are substantially the same as described in connection with the slip ring motor of Fig. 3, the power for the control circuit being taken from lines L1, L2 by means of wires 74, 75.

The operation of the mechanism as connected to the squirrel cage motor and the synchronous motor will be obvious in view of the description and the operation of equipment as explained in connection with the discussion of Fig. 3.

As a result of my invention it will be apparent that I have provided a novel combination of standard pieces of electrical equipment which, when connected as shown in each of the three wiring diagrams, and set for automatic stop and start control, will effect automatic unloading of the compressor upon a predetermined high receiver tank pressure and, whenever this is attained, i. e. every time it is attained; stop the motor, but allow the motor to keep on running for a small interval of time before it is automatically stopped so as to permit the machinery to come to a smooth stop. The resulting jars and stresses on the parts due to sudden stopping are thus eliminated and in the case of a belt drive the invention provides a simple solution of the problem of keeping the belt on its pulleys when the machine is shut down. By the use of the Penn pilot valve, if desired, the compressor may be loaded and unloaded to maintain the desired receiver tank pressure without starting and stopping the motor simply by adjusting the pressure switch and pilot valve so that the latter will trip before the pressure switch and thus cause unloading of the compressor without stopping of the motor. This operation is, however, disclosed and claimed in a copending application of John W. Sanford, Serial No. 282,256, filed June 1, 1928.

While I have in this application specifically described three forms which my invention may assume in practice, it will be understood that these forms of the same are shown for purposes of illustration and that the invention may be modified and embodied in various other forms without departing from its spirit or the scope of the appended claims.

What I claim as new and desire to secure by Letters Patent is:

1. In a compressor controlling system, a compressor, a motor for driving the same, means for automatically stopping said compressor in response to receiver tank pressure whenever the receiver tank pressure reaches a predetermined desired maximum value, said means including a receiver pressure actuated circuit breaking switch, an unloader for said compressor, and controlling means for said unloader automatically operative to effect unloading before stopping of said compressor.

2. In a compressor controlling system, a compressor, an electric motor for driving the same, means for automatically stopping said compressor in response to receiver tank pressure whenever the receiver tank pressure reaches a predetermined desired maximum value, said means including a switch moved to open position by receiver pressure an unloader for said compressor, pressure responsive means for controlling said unloader, and means for delaying stopping of said compressor until a predetermined time after unloading.

3. In a compressor controlling mechanism, a compressor, a motor for driving the same, means for automatically stopping and starting said motor in response to receiver tank pressure operative to stop the compressor whenever receiver tank pressure reaches a predetermined desired maximum value and to start it again when receiver tank pressure reaches a predetermined desired minimum value, an unloader for said compressor, electrical controlling means for said unloader including a switch responsive to receiver tank pressure and moved to open position thereby for automatically effecting unloading of said compressor, and means for insuring complete unloading of said compressor before stopping.

4. In a compressor controlling system, a compressor, an electric motor for driving the same, electrical means for automatically starting and stopping said driving motor, a pressure switch responsive to receiver tank pressure for controlling said electrical start and stop means to initiate compressor drive when receiver tank pressure reaches a predetermined minimum value and to stop compressor drive whenever receiver tank pressure reaches a predetermined desired maximum value, and in open position at the maximum desired pressure an unloader for said compressor, controlling mechanism for said unloader including said pressure switch, and means for insuring continued operation of said motor for a predetermined time after unloading of said compressor.

5. In a compressor controlling system, a compressor, an electric motor for driving the same, means for automatically starting and stopping said motor, means for controlling said start and stop means in response to receiver tank pressure operative to effect starting when receiver tank pressure reaches a predetermined minimum value and to effect stopping whenever a maximum desired receiver tank pressure is attained, an unloader for said compressor, electrical means for controlling said unloader, said electrical means also being controlled by said pressure responsive device and including a switch actuated directly thereby, and means for maintaining the power supply to said motor a predetermined time after unloading of the compressor.

6. In a compressor controlling system, a compressor, an electric motor for driving the same, an unloader for said compressor, electrical means for controlling said unloader operative when de-energized to unload the compressor and when energized to permit loading of the compressor, a directly pressure responsive switch for directly controlling the circuit through said electric unloader control means, and means under the control of said pressure responsive device both for starting said motor and for stopping the latter a predetermined time after unloading of the compressor.

7. In a compressor controlling system, a compressor, a motor for driving the same, means for automatically starting and stopping said motor in response to receiver tank pressure to initiate compressor drive when receiver tank pressure reaches a predetermined minimum value and to stop compressor drive whenever receiver tank pressure reaches a predetermined desired maximum value, an unloader for said compressor, electrical means for controlling said unloader operative when energized to permit loading and when de-energized to prevent loading, means for energizing said unloader circuit from one of the motor circuits after the motor is started, and means for controlling energizing of said circuit in response to receiver pressure comprising an element of said motor control means.

8. In a compressor controlling system, a compressor, a motor for driving the same, an unloader for the compressor, electrical means for controlling said unloader to prevent loading when de-energized and to permit loading when energized, a double pressure switch responsive to receiver tank pressure, one part of which controls said unloader control circuit, means for automatically starting and stopping said compressor controlled by the other part of said pressure switch and operative to effect stopping of the compressor only a predetermined time after opening of said switch for unloading of the compressor.

9. In a compressor controlling system, a compressor, a motor for driving the same, an unloader for the compressor, a pressure responsive device for controlling the unloader, means for automatically starting and stopping said motor including a definite time relay and operative to initiate compressor drive when receiver tank pressure reaches a predetermined minimum value and to stop compressor drive whenever receiver tank pressure reaches a predetermined desired maximum value, and means controlled by said pressure responsive device for effecting control of said time relay to cause stopping of the motor a predetermined time after unloading of the compressor.

10. In a compressor controlling system, the combination defined in claim 9 wherein said definite time relay is of the type adapted to close a circuit immediately when energized and to open after time delay when de-energized, and means for de-energizing said relay upon opening of said pressure responsive switch.

11. In a compressor system, a compressor, a driving motor therefor, a compressor discharge pressure controlled switch mechanism, and circuits simultaneously controlled thereby and respectively controlling loading and unloading of said compressor and both starting and stopping of said motor, said last mentioned circuit having associated therewith means for delaying stopping of said motor until after said compressor is unloaded.

12. In a compressor system, a compressor, a driving motor therefor, a compressor discharge pressure controlled switch mechanism, circuits simultaneously controlled thereby and respectively controlling loading and unloading of said compressor and starting and both stopping of said motor, said last mentioned circuit having associated therewith means for delaying stopping of said motor until after said compressor is unloaded, and means operable at will for making ineffective said second mentioned circuit to permit control of said compressor system by the unloading and reloading of the compressor while the drive thereof by said motor is continuous.

13. In a compressor system, a compressor, a driving motor therefor, a compressor discharge pressure controlled switch mechanism, circuits simultaneously controlled thereby and respectively controlling loading and unloading of said compressor and both starting and stopping of said motor, said last mentioned circuit having associated therewith means for delaying stopping of said motor until after said compressor is unloaded, and said motor having starting mechanism through which said first mentioned circuit is supplied with current only when said motor has come up to substantially full speed.

14. In a compressor controlling system, a compressor, a motor for driving the same, a device responsive to compressor discharge pressure, and motor control and compressor unloading devices each directly controlled by said compressor discharge pressure responsive device independently of the other, one of said last mentioned devices including means for causing unloading to precede stopping of said motor.

15. In a compressor controlling system, a compressor, a motor for driving the same, a device responsive to compressor discharge pressure, motor control and compressor unloading devices each directly controlled by said compressor discharge pressure responsive device independently of the other, one of said last mentioned devices including means for causing unloading to precede stopping of said motor, and means for at will interrupting control of said motor by said motor control device to permit continuous operation of the motor while said unloading device continues to function in accordance with compressor discharge pressure variations.

16. In a compressor controlling system, a compressor, a motor for driving the same, means for automatically stopping said compressor in response to receiver tank pressure, an unloader for said compressor, controlling means for said unloader automatically operative to effect unloading before stopping of said compressor, and means for rendering at will said first mentioned means inoperative while maintaining said second mentioned means operative, whereby said compressor may be driven continuously and loaded and unloaded in accordance with receiver pressure.

17. In a compressor controlling system, a compressor, a motor for driving the same, means for automatically stopping said compressor in response to receiver tank pressure, a compressor discharge pressure operated unloader for said compressor, and controlling means for said unloader automatically operative to effect unloading before stopping of said compressor.

18. In a compressor controlling system, a compressor, an electric motor for driving the same, means for automatically stopping said compressor in response to receiver tank pressure, a compressor discharge pressure operated unloader for said compressor, pressure responsive means for controlling said unloader, and means for stopping said compressor a predetermined time after unloading.

19. In a compressor controlling mechanism, a compressor, a motor for driving the same, means for automatically stopping and starting said motor in response to receiver tank pressure, a compressor discharge pressure operated unloader for said compressor, electrical controlling means for said unloader including a switch responsive to receiver tank pressure for automatically effecting unloading of said compressor, and means for insuring complete unloading of said compressor before stopping.

20. In a compressor controlling system, a compressor, an electric motor for driving the same, electrical means for automatically starting and stopping said driving motor, a pressure switch responsive to receiver tank pressure for controlling said electrical start and stop means, a compressor discharge pressure operated unloader for said compressor, controlling mechanism for said unloader including said pressure switch, and means for insuring continued operation of said motor for a predetermined time after unloading of said compressor.

21. In a compressor controlling system, a compressor, an electric motor for driving the same, means for automatically starting and stopping said motor, means for controlling said start and stop means in response to receiver tank pressure, a compressor discharge pressure operated unloader for said compressor, electrical means for controlling said unloader, said electrical means also being controlled by said pressure responsive device, and means for maintaining the power supply to said motor a predetermined time after unloading of the compressor.

22. In a compressor controlling system, a compressor, an electric motor for driving the same, a compressor discharge pressure operated unloader for said compressor, electrical means for controlling said unloader operative when de-energized to unload the compressor and when energized to permit loading of the compressor, a pressure responsive switch for controlling the circuit through said electric unloader control means, and means under the control of said pressure responsive device for starting and stopping said motor a predetermined time after unloading of the compressor.

In testimony whereof I affix my signature.

WILLIAM E. HUGHES.